Figure 1:
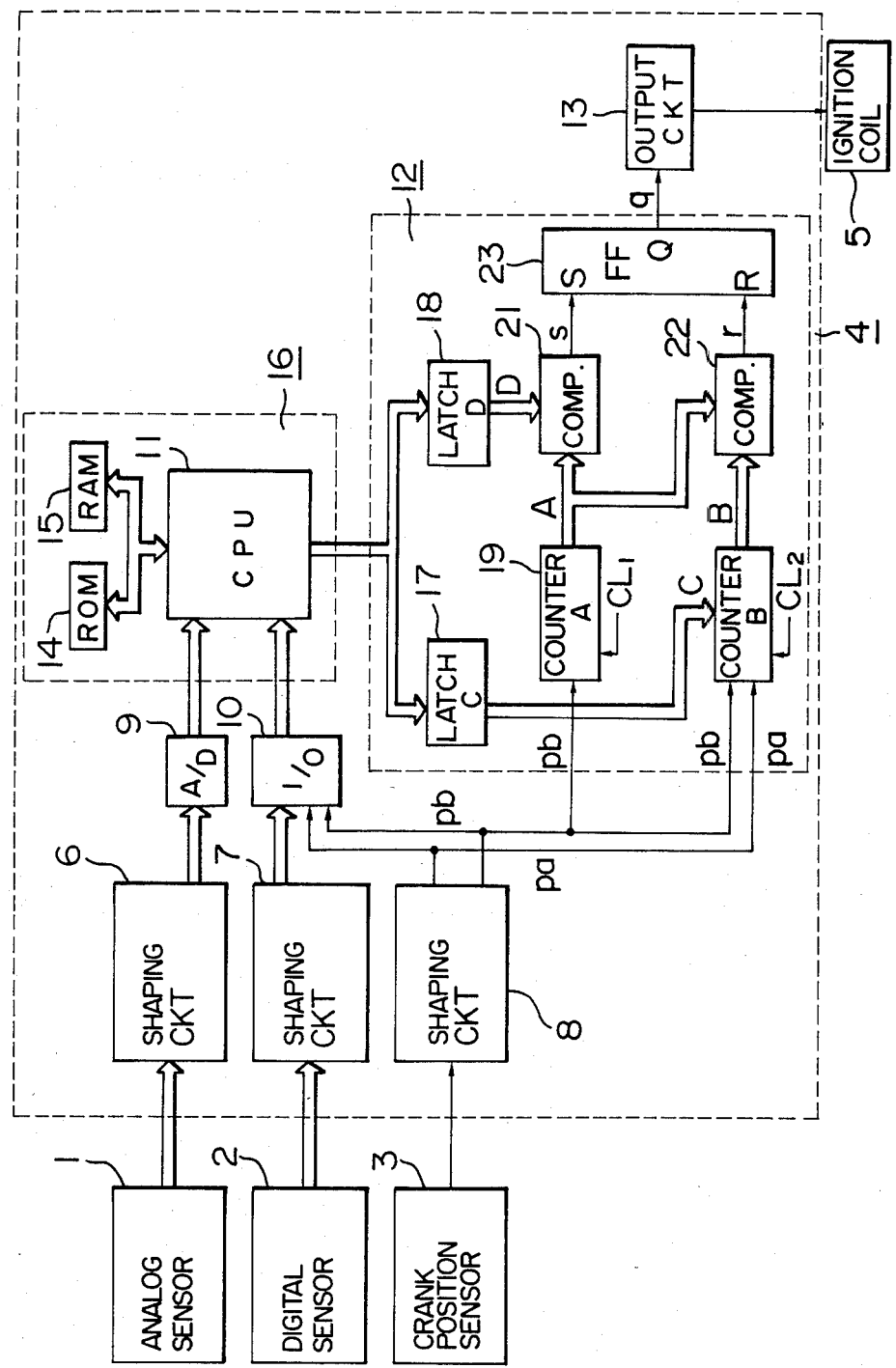

United States Patent [19]

Yoshida et al.

[11] Patent Number: 4,552,110
[45] Date of Patent: Nov. 12, 1985

[54] ELECTRONIC IGNITION CONTROL SYSTEM

[75] Inventors: Tatsuya Yoshida, Katsuta; Hirosi Katada, Mito, both of Japan

[73] Assignee: Hitachi, Ltd., Tokyo, Japan

[21] Appl. No.: 553,233

[22] Filed: Nov. 18, 1983

[30] Foreign Application Priority Data

Nov. 22, 1982 [JP] Japan .............................. 57-203760

[51] Int. Cl.⁴ ........................... F02P 5/08; F02P 5/10; F02P 5/14
[52] U.S. Cl. ..................................... 123/416; 123/418
[58] Field of Search ................ 123/414, 416, 417, 418

[56] References Cited

U.S. PATENT DOCUMENTS 4,127,092 11/1978 Fresow et al. ...................... 123/418
4,167,923 9/1979 Iwase et al. ......................... 123/416
4,408,296 10/1983 Robbi et al. ........................ 123/416
4,426,975 1/1984 Suzuki et al. ....................... 123/418

Primary Examiner—Parshotam S. Lall
Assistant Examiner—W. R. Wolfe
Attorney, Agent, or Firm—Antonelli, Terry & Wands

[57] ABSTRACT

In an electronic ignition control system utilizing a microcomputer, a reference signal indicative of a crank reference position is counted to sense the rotational speed of an internal combustion engine thereby controlling the ignition timing of the engine. In the system, a reference ignition position is computed using the sensed engine rotational speed as a parameter, and this reference ignition position is corrected using a plurality of information indicative of the operating condition of the engine including the information of the engine rotational speed as parameters.

6 Claims, 2 Drawing Figures

ELECTRONIC IGNITION CONTROL SYSTEM

This invention relates to an ignition control system for electronically controlling the spark advance in an internal combustion engine, and more particularly to an electronic ignition control system of digital type which can control the position of ignition and the duration of current supply with high accuracy without the use of a crank angle sensor.

In an internal combustion engine of electrical ignition type such as a gasoline engine, the control of ignition timing is an important factor exerting a great influence upon the performance and operation of the engine, and, therefore, ignition control with high accuracy is an indispensable requisite for the control of the engine.

This ignition control is also generally called the spark advance control since it resorts mostly to the control of the angle of spark advance from the top dead center of the piston mounted on the crankshaft of the engine. In the past, a mechanical ignition control system such as that employing a governor for the ignition timing control or that employing a vacuum advancer utilizing the vacuum in the intake manifold for the ignition timing control was favoritely used. In recent years, an electronic ignition control system designed for electronically controlling the ignition timing has been developed and widely used together with the mechanical ignition control system.

As this electronic ignition control system, an analog type has been first proposed and put into practical use. However, the electronic ignition control system of the analog type has been difficult to sufficiently deal with a wide variety of spark advance requirements satisfying the severe demand for the engine performance, and, because of the above difficulty, it has found its limit in the accuracy of ignition timing control. In an effort to overcome the limited accuracy of the analog ignition timing control, a digital type of electronic ignition control system has been proposed and put into practical use.

As this electronic ignition control system of the digital type, various kinds are already known. In a known electronic ignition control system of the digital type, the ignition timing is controlled on the basis of a crank angle signal alone or on the basis of the combination of the crank angle signal and time. Although the ignition timing can be controlled with high accuracy by such an electronic ignition control system, this system is defective in that the necessity for provision of a sensor of complex structure for generating the crank angle signal and a signal shaping circuit of complex structure for shaping the crank angle signal leads to an undesirable increase in the cost.

A system which avoids the above defect is disclosed in, for example, Japanese Patent Application Laid-open No. 85725/75. In this known system, the ignition timing is controlled on the basis of the time alone without resorting to the crank angle signal. More precisely, in the disclosed ignition control system, the position of starting current supply to the ignition coil is singly computed by an arithmetic and logic circuit, and the duration of current supply is maintained constant to determine the position of ignition. However, this system has been defective in that a variation of the rotation speed of the engine results in a corresponding shift of the position of ignition, and the ignition timing cannot therefore be accurately controlled.

Another electronic ignition control system of the digital type is known in which the ignition timing is also controlled on the basis of the time alone without resorting to the crank angle signal. In this latter system, a signal is generated whenever the crankshaft reaches a reference position (a crank reference position) of, for example, 180° or 360° in terms of the angular position of rotation of the crankshaft so as to sense the rotation speed of the engine by measurement of the interval between the signal pulses and to compute the position of ignition on the basis of the thus sensed rotation speed of the engine, and the ignition is initiated as soon as the result of computation attains a predetermined setting.

However, this latter system has also been defective in that, when the rotation speed of the engine changes during the period of computation of the position of ignition, a corresponding change of the position of ignition results inevitably, and the desired ignition control with high accuracy becomes difficult in an engine in which the rotation speed tends to be subject to a great variation.

With a view to avoid the prior art defects pointed out above, it is a primary object of the present invention to provide a novel and improved electronic ignition control system of the digital type which can reliably control the position of ignition and the duration of current supply with high accuracy regardless of a great variation of the engine rotation speed and which can easily deal with a wide variety of spark advance requirements.

The electronic ignition control system of the present invention which attains the above object is featured by the provision of a first arithmetic and logic unit sensing the rotation speed of an engine on the basis of a signal indicative of arrival of the crankshaft at a reference position, and, at the same time, computing a reference position of ignition, and an independent second arithmetic and logic unit computing, at intervals of a predetermined period of time, the degree of correction of the reference ignition position depending on the operating condition of the engine but without regard to the rotation of the engine.

The present invention will be apparent from the following detailed description taken in conjunction with the accompanying drawings, in which:

FIG. 1 is a block diagram of a preferred embodiment of the electronic ignition control system of the digital type according to the present invention; and FIGS. 2(a)–2(j) are timing chart illustrating the operation of the system shown in FIG. 1.

A preferred embodiment of the electronic ignition control system of the present invention applied to an internal combustion engine will now be described in detail with reference to the drawings.

Referring to FIG. 1, the electronic ignition control system of the digital type includes a sensor 1 generating an analog output; a sensor 2 generating a digital output; a crank reference position sensor 3; a control unit including all required control circuits; a conventional ignition coil 5; an analog signal shaping circuit 6; a digital signal shaping circuit; a crank reference position signal shaping circuit 8; an analog-digital converter 9 (abbreviated hereinafter as an A/D); a digital input interface 10 (abbreviated hereinafter as an I/0); a central processing unit 11 (abbreviated hereinafter as a CPU); a first arithmetic and logic unit 12; an output circuit 13; a read-only memory 14 (abbreviated hereinafter as an ROM); a random access memory 15 (abbreviated hereinafter as an RAM); a second arithmetic and logic unit 16; latches 17, 18; counters 19, 20; comparators 21, 22; and a flip-flop 23 (abbreviated hereinafter as an FF).

The sensor 1 represents the entirety of a plurality of sensors each generating an analog output, such as, an intake negative pressure sensor sensing the negative pressure in the intake manifold of the engine, a temperature sensor sensing the temperature of the engine or the temperature of engine cooling water and a sensor sensing the opening of the throttle valve.

The sensor 2 represents the entirety of a plurality of sensors each generating a digital output, such as, a starter switch sensing the rotation of the starter, a neutral switch sensing whether or not the transmission gearing is in its neutral position, and a tumble switch sensing tumbling of a vehicle such as a motor bicycle.

The crank reference position sensor 3 functions to generate a crank reference position signal by sensing that the crankshaft of the engine under rotation reaches its predetermined reference position.

The first shaping circuit 6 functions to process the various analog output signals from the sensor 1 independently of one another and to apply the processed signals to the CPU 11 after analog-digital conversion by the A/D 9.

The second shaping circuit 7 functions to shape the pulse waveform of the various digital output signals from the sensor 2 independently of one another and to apply the shaped signals to the CPU 11 through the I/0 10.

The third shaping circuit 8 functions to process the output signal from the crank reference position sensor 3 thereby generating pulses pa and pb when the signal is a positive signal a and a negative signal b, respectively, and to apply such a signal to the CPU 11 through the I/0 10 and to the counters 19 and 20 in the first arithmetic and logic unit 12.

The first arithmetic and logic unit 12 includes the latches 17, 18, counters 19, 20, comparators 21, 22 and FF 23. Correction data C and D described later are applied to the latches 17 and 18, respectively. The first counter 19 is reset by the pulse pb and, at the same time, starts to count a first clock signal $CL_l$ having a predetermined frequency. The second counter 20 holding the data C as its initial value starts to count a second clock signal $CL_2$ having a predetermined frequency in response to the application of the pulse pa and ceases to count the clock signal $CL_2$ in response to the application of the pulse pb which acts to reset the counter 20. The first comparator 21 compares the data count A of the first counter 19 with the correction data D. The second comparator compares the data count A of the first counter 19 with the data count B of the second counter 20. The FF 23 is set by the output of the first comparator 21 and is reset by the output of the second comparator 22. Thus, on the basis of the sensed rotation speed of the engine, the first arithmetic and logic unit 12 functions to compute the ignition position each time the crank reference position signal is generated, that is, in synchronism with the rotation of the engine.

The second arithmetic and logic unit 16 includes a microcomputer including the CPU 11, the ROM 14 which is a program memory, and the RAM 15 which is a data memory, and functions to compute the correction data C and D at intervals of a predetermined period of time on the basis of the output signals from the sensors 1 to 3.

The output circuit 13 includes an element such as a power transistor and functions to supply energizing current to the ignition coil 5 depending on the output of the FF 23.

Figure 2:
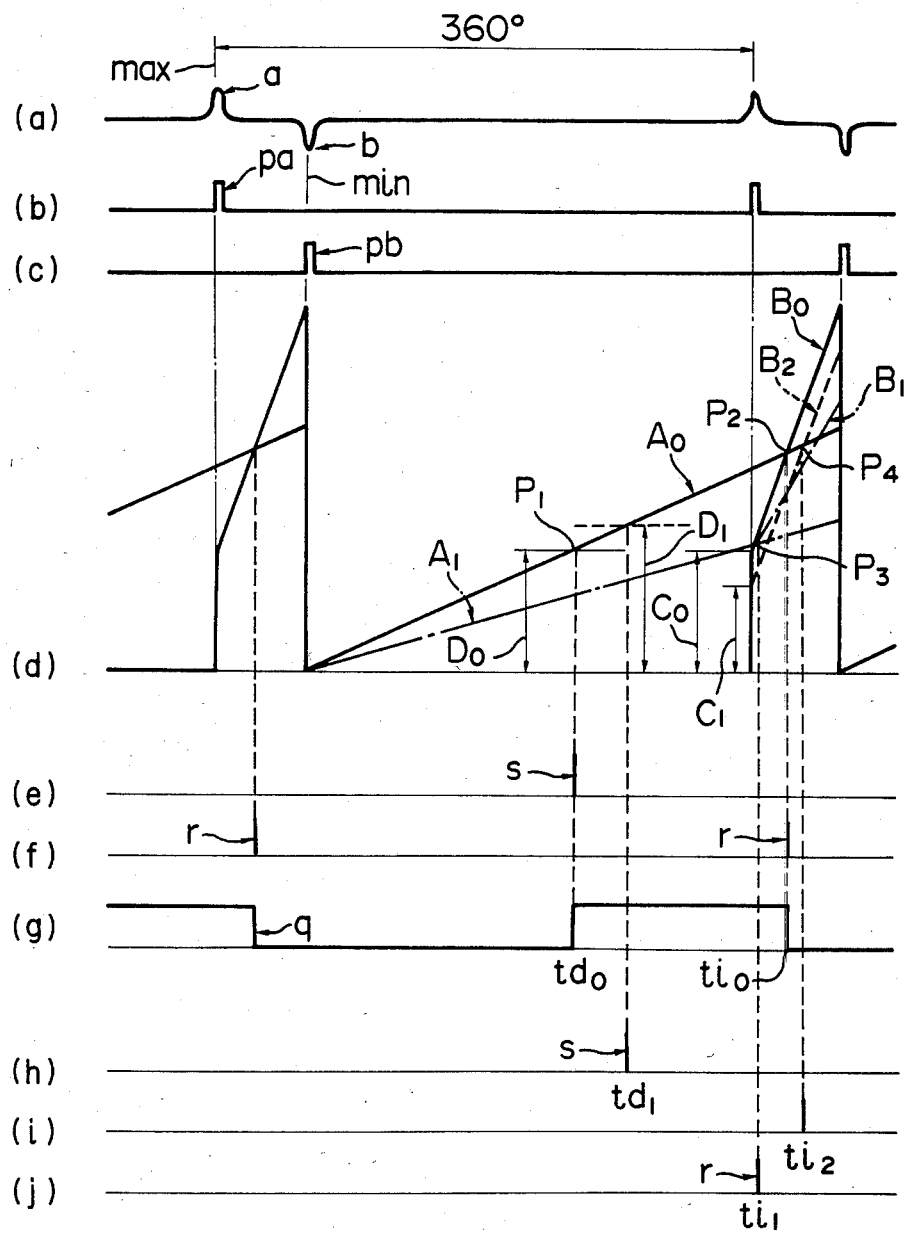

As shown most clearly in FIG. 2, each time the crankshaft of the engine under rotation reaches a predetermined angular reference position, signals a and b as shown in FIG. 2(a) are generated in pair from the crank reference position sensor 3 in the vicinity of the crank reference position, and the third shaping circuit 8 generates a pulse pa as shown in FIG. 2(b) in response to the signal a and a pulse pb as shown in FIG. 2(c) in response to the signal b.

In embodiment of the present invention, the timing of generation of the signals a and b from the crank reference position sensor 3 coincide with the maximum and minimum spark advance positions max and min, respectively. Therefore, the pulse pa is indicative of the maximum spark advance position max, and the pulse pb is indicative of the minimum spark advance position min.

The pulses pa and pb so generated are applied to the counters 19 and 20 in the first arithmetic and logic unit 12 in the manner described above, and, to the CPU 11 in the second arithmetic and logic unit 16 through the I/0 10.

First, the first counter 19 is reset by the pulse pb and then starts to count the first clock signal $CL_l$. Thus, the data count A of this counter 19 starts to increase from zero in response to the leading edge of the pulse pb and then increases with a predetermined gradient (indicative of the rate of count increase) determined by the frequency of the clock signal $CL_l$ until it is restored to zero again in response to the next pulse pb. Therefore, the data count A of the counter 19 increases as shown by $A_0$ in FIG. 2(d).

The second counter 20, which holds the correction data C, for example, $C_0$ stored in the first latch 17 as its initial value, starts to count the second clock signal $CL_2$ at the timing of application of the pulse pa and is finally reset in response to the application of the pulse pb. Therefore, its data count or output data B increases as, for example, shown by $B_0$ in FIG. 2(d). It will be apparent from FIG. 2(d) that, when the data count A of the first counter 19 increasing along, for example, the curve $A_0$ is compared with the data count B of the second counter 20 increasing along, for example, the curve $B_0$, the gradient of the data curve $B_0$ is larger than that of the data curve $A_0$. This is because the frequency of the second clock signal $CL_2$ is selected to be higher than that of the first clock signal $CL_l$, and this is the essential condition of the present invention.

The output data A of the counter 19 is applied to the first comparator 21 to be compared with the correction data D stored in the second latch 18. Therefore, when now this correction data D is $D_0$, a coincidence pulse s as shown in FIG. 2(e) is generated from the comparator 21 when coincidence is reached between the data $A_0$ and $D_0$ at a point Pl in FIG. 2(d). Consequently, the FF 23 is set by the pulse s to generate its output g of "1" level as shown in FIG. 2(g).

The output data B of the second counter 20 is applied to the second comparator 22 to be compared with the output data A of the first counter 19. Therefore, a coincidence pulse as shown in FIG. 2(f) is generated from the comparator 22 when coincidence is reached between the data A and B at a point $P_2$ in FIG. 2(d). Consequently, the FF 23 is reset by the pulse r to generate its output q of "0" level as shown in FIG. 2(g).

The output q of the FF 23 is applied to the output circuit 13 which supplies energizing current to the ignition coil 5 only when the output q of the FF 23 is in its "1" level. Therefore, the current-supply starting position is represented by the position $td_o$ at which the pulse s shown in FIG. 2(e) is generated, and the ignition position is represented by the position $ti_o$ at which the pulse r shown in FIG. 2(f) is generated.

The above description refers to the case in which the rotation speed of the engine is maintained at a certain value. Suppose then that the rotation speed of the engine exceeds the above value.

In such a case, the output data A of the first counter 19 changes now with a gradient as shown by $A_1$ in FIG. 2(d), and, similarly, the output data B of the second counter 20 changes now with a gradient as shown by $B_l$ in FIG. 2(d).

As a result, coincidence is reached between the input data of the second comparator 22 at a point $P_3$ in FIG. 2(d), and the output r of the comparator 22 is generated at a position $ti_l$ shown in FIG. 2(j). This means that the ignition position shifts from the previous position $ti_0$ to the earlier or advanced position $ti_l$.

Also, although not shown, when the rotation speed of the engine becomes lower than the above-described certain value the position at which coincidence is reached between the output data A of the first counter 19 and that B of the second counter 20 is conversely delayed resulting in a delayed ignition position.

Thus, the manner of control is such that the position of generation of the output r from the second comparator 22, that is, the ignition position shifts automatically depending on the engine rotation speed between the position of generation of the pulse pa and the position of generation of the pulse pb, and the ignition position is advanced with the increase in the engine rotation speed. The control range is thus determined by the positions of generation of the pulses pa and pb. Therefore, when these positions of generation of the pulses pa and pb are selected to correspond to the maximum and minimum spark advance positions respectively, the ignition position can be controlled within the range of from the minimum spark advance position to the maximum spark advance position.

Therefore, in the present invention, the first arithmetic and logic unit 12 determines the ignition position within the range of from the minimum spark advance position to the maximum spark advance position on the basis of the single parameter, which is the engine rotation speed, and executes the processing for determining the ignition position during every revolution of the engine.

The pulses pa and pb are also applied through the I/0 10 to the second arithmetic and logic unit 16 to which the data from the analog and digital sensors 1 and 2 are also applied. Thus, the second arithmetic and logic unit 16 processes the data including not only the data of the engine rotation speed but also those of the other engine operation parameters to compute the correction data C and D on the basis of the input data.

Suppose now that the operating condition of the engine changes, and the correction data C changes to $C_1$ from $C_0$ which was the previous value. Then, the data stored in the first latch 17 changes also to $C_l$ from $C_0$. In response to the application of the pulse pa, the second counter 20 holding this new data $C_1$ as its initial value starts to count the second clock signal $CL_2$. As a result, the output data B of the counter 20 holding the data $C_1$ as its initial value increases now with a gradient as shown by $B_2$ in FIG. 2(d), even when the rotation speed of the engine remains unchanged and the output data B of the counter 20 at that time should change or increase with a gradient as shown by $B_0$. In this case, coincidence is reached at a position $P_4$ between the input data of the second comparator 22 as shown in FIG. 2(d), and the output r of the comparator 22 is now generated at a position $ti_2$ as shown in FIG. 2(i). This means that the ignition position is delayed to the position $ti_2$ from the previous position $ti_0$. The above change results from the fact that the correction data C stored in the latch 17 is now changed from the previous data $C_0$ to the data $C_1$ of a smaller value. Thus, by changing the correction data C applied from the second arithmetic and logic unit 16 to the latch 17 in the first arithmetic and logic unit 12, the ignition position can be corrected independently of the ignition position determined by the first arithmetic and logic unit 12 in relation to the sensed rotation speed of the engine.

On the other hand, the correction data D applied to the second latch 18 from the second arithmetic and logic unit 16 is used as a data to be compared in the first comparator 21 with the output data A of the first counter 19 as described already, and the coincidence between the data D and A provides the input s to the FF 23. In other words, on the basis of the correction data D, the position of starting current supply to the ignition coil 5 is determined as, for example, shown by $td_0$ in FIG. 2(g) or $td_1$ in FIG. 2(h). Thus, the current-supply starting position can be corrected by the function of the second arithmetic and logic unit 16.

The computing operation of the second arithmetic and logic unit 16 is performed at intervals of a predetermined period of time by the CPU 11 in a relation independent of the rotation of the engine, and updating of the correction data C and D is repeated in a relation independent of the computing operation of the first arithmetic and logic unit 12.

According to the present invention, therefore, the ignition position to be corrected in dependence upon on the rotational speed of the engine is corrected on the basis of the newest data obtained continuously during every revolution of the crankshaft independently of the engine rotation speed, and the ignition position and current-supply starting position to be corrected in dependence upon the rotational speed and other operation parameters of the engine are corrected on the basis of the data updated at intervals of a predetermined period of time independently of the rotation of the engine. Therefore, the ignition timing can be controlled on the basis of the newest data even when the engine rotating in a low speed range, and it can also be controlled with high accuracy even when the rotational speed of the engine varies greatly.

Although the above description has referred to an application of the present invention to a single-cylinder engine by way of example, it is apparent that the present invention is in no way limited to such a specific application and is also equally effectively applicable to a multi-cylinder engine.

It will be understood from the foregoing detailed description that, according to the present invention, a first arithmetic and logic unit operating in synchronism with the rotation of an engine and a second arithmetic and logic unit operating at intervals of a predetermined period of time independently of the rotation of the engine are used for the ignition control of the engine so as to avoid the prior art defects pointed out hereinbefore.

Therefore, an electronic ignition control system of the digital type can be provided which can reliably control the ignition timing with high accuracy in spite of a great variation of the rotation speed of the engine and which can provide the following distinct advantages:

The ignition timing can be controlled with high accuracy without resorting to the crank angle signal. Therefore, the crank angle sensor and crank angle signal processing circuit essentially required in the prior art system are unnecessary, and the system according to the present invention has a simplified structure which reduces the scale and cost of the system.

By arranging so that the pulses of the crank reference signal appear at the maximum and minimum spark advance positions, the rate of data utilization can be improved to improve the resolution of the position of ignition thereby ensuring ignition timing control with higher accuracy.

Since the current-supply starting position can be independently controlled, the duration of current supply to the ignition coil can also be controlled with high accuracy, and the ignition energy can be always controlled to be optimum, thereby reliably preventing occurrence of trouble such as misfire.

The counters provided for controlling the current-supply starting position can also be used for controlling the ignition position, thereby simplifying the structure of the system.

We claim:

1. An electronic ignition control system wherein a rotational speed of an engine is sensed on the basis of a reference signal indicative of a crank reference position for the purpose of spark advance control, said system comprising a first arithmetic and logic unit for carrying out a computation in synchronism with the rotation of the engine, and a second arithmetic and logic unit for carrying out a computation at intervals of a predetermined period of time, said first arithmetic and logic unit computing a reference ignition position using the sensed rotational speed of the engine as a parameter, said second arithmetic and logic unit correcting said reference ignition position using a plurality of information indicative of the operating condition of the engine including the information of the engine rotational speed as parameters, said crank reference position includes a leading edge and a trailing edge defining a predetermined width therebetween, said reference signal includes a first reference signal indicative of the position of said leading edge and a second reference signal indicative to the position of said trailing edge, and wherein said first arithmetic and logic unit includes a first counter counting a first clock signal having a predetermined frequency applied at its count input and starting to count said first clock signal after being reset by said second reference signal, and a second counter counting a second clock signal having a frequency higher than that of said first clock signal applied as its count input, said second counter starting to count said second clock signal in response to the application of said first reference signal and ceasing to count said second clock signal after being reset by said second reference signal, and a signal indicative of said reference ignition position is generated when coincidence is reached between the data counts of said first and second counters.

2. An electronic ignition control system as claimed in claim 1, wherein the output of said second arithmetic and logic unit is applied to said second counter as an initial value used for correction of the spark advance.

3. An electronic ignition control system as claimed in claim 1, wherein said second arithmetic and logic unit computes the current-supply starting position, and a signal indicative of the current-supply starting timing is generated when coincidence is reached between the result of computation by said second arithmetic and logic unit and the data count of said first counter.

4. An electronic ignition control system wherein a rotational speed of an engine is sensed on the basis of a reference signal indicative of a crank reference position for the purpose of spark advance control, said system comprising a first arithmetic and logic unit for carrying out a computation in synchronism with the rotation of the engine and a second arithmetic logic unit for carrying out a computation at intervals of a predetermined period of time, said first arithmetic and logic unit computing a reference ignition position using the sensed rotational speed of the engine as a parameter, said second arithmetic and logic unit correcting said reference ignition position using a plurality of information indicative of the operation condition of the engine including the information of the engine rotational speed as parameters, said crank reference position includes a leading edge and a trailing edge defining a predetermined width therebetween, said reference signal includes a first reference signal indicative of the position of said leading edge and a second reference signal indicative of the position of said trailing edge, said leading and trailing edges of said crank reference position respectively coincide with the maximum and minimum spark advance positions, and wherein said first arithmetic and logic unit includes a first counter counting a first clock signal having a predetermined frequency applied as its count input and starting to count said first clock signal after being reset by said second reference signal, and a second counter counting a second clock signal having a frequency higher than that of said first clock signal applied as its count input, said second counter starting to count said second clock signal in response to the application of said first reference signal and ceasing to count said second clock signal after being reset by said second reference signal, and a signal indicative of said reference ignition position is generated when coincidence is reached between the data counts of said first and second counters.

5. An electronic ignition control system as claimed in claim 4, wherein the output of said second arithmetic and logic unit is applied to said second counter as an initial value based for correction of the spark advance.

6. An electronic ignition control system as claimed in claim 4, wherein said second arithmetic and logic unit computes the current-supply starting position, and a signal indicative of the current-supply starting timing is generated when coincidence is reached between the result of computation by said second arithmetic and logic unit and the data count of said first counter.

* * * * *